United States Patent [19]

Hanin

[11] 4,435,044

[45] Mar. 6, 1984

[54] REAR VIEW MIRROR ASSEMBLY

[75] Inventor: Elliott Hanin, Potomac, Md.

[73] Assignee: IRV Hanin, Miami Beach, Fla.

[21] Appl. No.: 359,063

[22] Filed: Mar. 17, 1982

[51] Int. Cl.³ .......................... G02B 5/08; G02B 5/10
[52] U.S. Cl. ..................................... 350/302; 350/307
[58] Field of Search ............... 350/302, 307, 299, 301, 350/293

[56] References Cited

U.S. PATENT DOCUMENTS

| | | | |
|---|---|---|---|
| 1,617,270 | 2/1927 | Paul | 350/302 |
| 2,085,000 | 0/0000 | Borba et al. | |
| 2,257,510 | 9/1941 | Mote | 350/302 |
| 2,346,739 | 0/0000 | Ewing | |
| 3,744,885 | 0/0000 | Hurtado | |
| 3,979,158 | 9/1976 | Yamashita et al. | 350/307 X |

Primary Examiner—John K. Corbin
Assistant Examiner—Richard F. Gallivan
Attorney, Agent, or Firm—Fleit, Jacobson, Cohn & Price

[57] ABSTRACT

An assembly of mirrors for viewing an area extending longitudinally rearwardly from a central portion of the back of a vehicle. The mirror assembly includes a first mirror positioned on a forward side portion of the vehicle so as to be directly viewable by a vehicle occupant or operator. A second mirror is positioned on an upper rear side portion of the vehicle, with the first and second mirrors cooperating with each other to define a viewing axis extending upwardly and rearwardly along the side of the vehicle. A third mirror is positioned on the top of the vehicle and spaced forwardly of the second mirror. The third mirror is positioned such that the first viewing axis is reflected thereon by the second mirror and, in turn, is reflected downwardly and rearwardly so as to permit viewing of an area extending longitudinally rearwardly from the back of the vehicle. Such area includes an area that is immediately adjacent the back of the vehicle.

8 Claims, 2 Drawing Figures

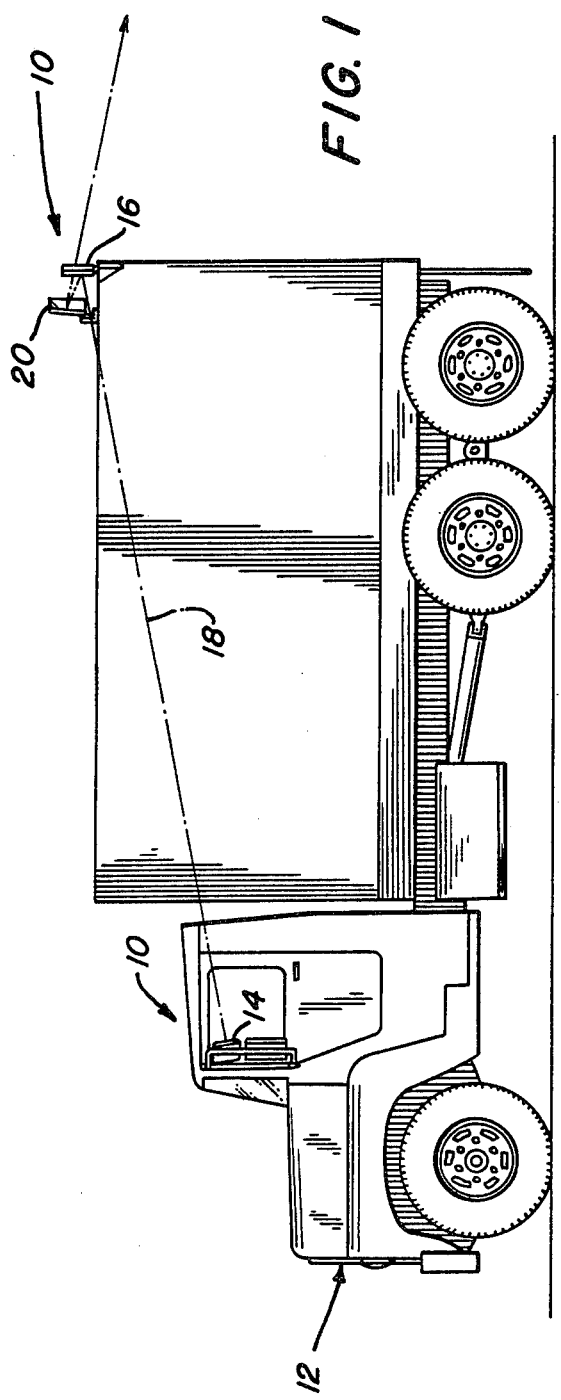
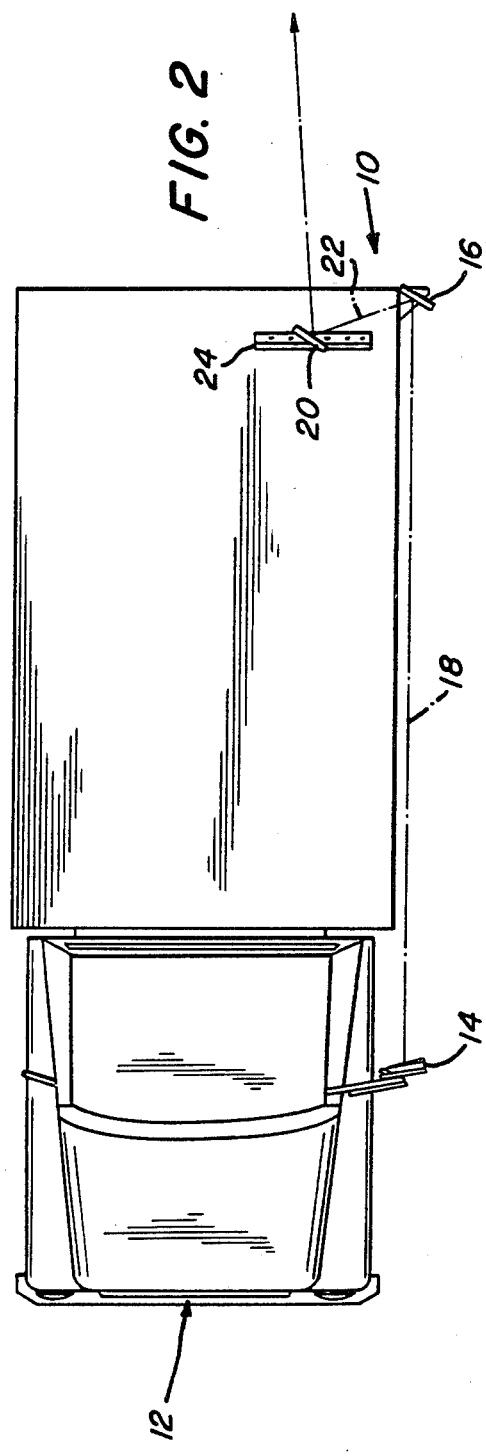

1

REAR VIEW MIRROR ASSEMBLY

BACKGROUND OF THE INVENTION

1. Field of the Invention

The present invention relates to a mirror assembly and a method of assembling mirrors for viewing an area extending longitudinally rearwardly from the back of a vehicle. More particularly, the invention provides an assembly of three mirrors that makes it possible to view an area immediately adjacent and directly behind the rear of a vehicle.

2. Description of the Prior Art

There has been a long recognized need for a system to view the area directly behind a vehicle so as to prevent accidents during backing of the vehicle.

An early rear view mirror structure is described in U.S. Pat. No. 2,085,000. Such mirror structure utilizes a mirror supporting bracket hingedly connected to a forward portion of the top of the vehicle. Two mirrors are positioned inside of the vehicle to permit viewing of the mirror exterior of the vehicle. However, such structure has limited use in viewing the area immediately behind the vehicle because the optical axis or line of sight strikes the ground a significant distance behind the rear of the vehicle. Further, it is relatively expensive to provide the required opening in the roof to allow viewing of the exterior mirror.

U.S. Pat. No. 2,346,739 describes a similar type of rear view mirror structure in which a mirror is mounted on the front top of the vehicle. As with the previously discussed patent, it is necessary to provide an opening in the vehicle roof to permit viewing of the mirror. Also, the system described in this patent does not permit viewing of the area immediately adjacent the rear of the vehicle.

Another type of viewing system is described in U.S. Pat. No. 3,744,885. Such system has a first or side view mirror mounted on the left front side of the vehicle that is directly viewable by an occupant of the vehicle, a second mirror mounted so as to extend rearwardly from the left rear corner of the vehicle, and a third mirror mounted on the rear of the vehicle. The mirrors are adjusted to provide a line of sight running from the vehicle occupant to the side view mirror, to the mirror extending rearwardly from the left rear corner, to the mirror positioned on the rear of the vehicle. As a result, a viewing range is provided of an area behind the vehicle. A problem with such assembly of mirrors is the relative vulnerability of the mirror connected to the rear corner of the vehicle. Also, the viewing area tends to be distorted. Further the assembly cannot be used if the rear of the vehicle is raised during a backing operation.

It is also known to provide a mirror assembly that includes a mirror mounted so as to extend rearwardly from the rear corner of a vehicle. Such assembly provides viewing of an area extending parallel to the back of the vehicle and is conventionally used to prevent theft of items from the back of a vehicle.

SUMMARY OF THE INVENTION

The present invention provides an improved mirror assembly that is usable to view an area extending longitudinally rearwardly from a central portion of the back of the vehicle. Such area includes the area adjacent the rear of the vehicle.

The mirrors used in the assembly are located so as to be relatively secure and protected by the vehicle.

With the mirror assembly provided by the present invention, a first mirror is positioned on a forward side portion of the vehicle so as to be directly viewable by a vehicle occupant or operator. A second mirror is positioned on an upper rear side portion of the vehicle. The first and second mirrors cooperate with each other to define a first optical axis or line of sight extending upwardly and rearwardly along the side of the vehicle. A third mirror is positioned on the top of the vehicle and spaced forwardly of the second mirror. The third mirror is so located that the first axis or line of sight is reflected thereon by the second mirror. The third mirror, in turn, reflects the line of sight to provide viewing of an area extending longitudinally rearwardly from the back of the vehicle. Positioning of the third mirror on the top of the truck greatly facilitates direct viewing of the area immediately adjacent the rear of the truck. Preferably, the third mirror is provided with a convex shape so as to provide an enhanced viewing area.

The invention, and its objects and advantages, will become more apparent in the detailed description of a preferred embodiment hereinafter presented.

BRIEF DESCRIPTION OF THE DRAWINGS

In the detailed description of the preferred embodiment of the invention hereinafter presented, reference is made to the accompanying drawings, in which:

FIG. 1 is a schematic side view of one embodiment of the mirror assembly provided by the present invention mounted on a vehicle; and FIG. 2 is a top view of FIG. 1.

DESCRIPTION OF THE PREFERRED EMBODIMENT

The present description will be directed in particular to elements forming part of, or cooperating more directly with, the present invention. Elements not specifically shown or described herein are understood to be selectable from those known in the art.

Referring now to the drawings, one embodiment of the present invention is illustrated and will be described in connection with a mirror assembly, generally designated 10. The mirror assembly 10 is illustrated mounted on a vehicle 12.

A first mirror 14 of the assembly 10 is located on the left front side of the vehicle so as to be directly viewable by a vehicle operator or occupant. A second mirror 16 of the assembly 10 is positioned on an upper rear portion of the left side of the vehicle. A first optical axis, line of vision, or line of sight 18 extends rearwardly and upwardly along the side of the vehicle between the first mirror 14 and the second mirror 16. A third mirror 20 is positioned on the top of the vehicle and is located forwardly of the second mirror 16. The relationship between the second mirror 16 and the third mirror 20 is such that the first optical axis or line of sight 18 is reflected as a second line of sight 22 onto the third mirror. The third mirror 20, in turn, reflects the second line of sight 22 downwardly and rearwardly of the back of the vehicle to provide viewing of an area immediately adjacent the rear of the vehicle. The viewed area extends longitudinally rearwardly from the vehicle.

In the illustrated embodiment, the mirror 16 is positioned at the left rear corner of the vehicle and is located above the plane of the top of the vehicle. In some installations, the mirror 16 is positioned spaced forwardly from the rear of the vehicle and is located below the plane of the top. The particular orientation of the mirror 16 is determined by the configuration of the vehicle. For instance, it has been found desirable to use a planar mirror that is oriented at an angle of approximately 15° with a plane extending parallel to the rear of the vehicle. A type of mirror identified as a "West Coast" mirror has been found useful in one embodiment of the invention. With this embodiment, a mounting bracket formed as an L-shaped member having a plurality of openings formed therein has been useful so that the mirror can be moved horizontally and vertically with respect to the vehicle. Also, the relationship between the mounting bracket and the second mirror is such that the angular orientation of the mirror is adjustable.

It also has been found desirable to use an adjustable mounting bracket for the third mirror 20. Such mounting bracket includes an L-shaped channel 24 having one flange secured to the top of the truck and a flange extending perpendicular to the top of the truck. The flange connected to the truck is provided with a plurality of apertures so that the mounting assembly can be moved with respect to the truck. Also, the upstanding flange has a plurality of apertures so that the position of the mirror is adjustable. An especially useful mirror for the third mirror 20 is a convex mirror having an approximately eight inch diameter, a one foot focal length, and a mirror radius of approximately two feet.

As illustrated in FIG. 2, the third mirror 20 is positioned on a left rear portion of the top of the vehicle. It is preferable that a relatively short distance be provided between the mirrors 16 and 20 so that the height of the mirror 20 above the top of the vehicle can be kept to a minimum.

Previously, a specific embodiment of the present invention has been described. It should be appreciated, however, that such embodiment has been described for the purposes of illustration only, without any intention of limiting the scope of the present invention. For instance, the first mirror 14, instead of being a separate mirror as illustrated in FIG. 1, can be part of a conventional side view mirror. Accordingly, it is the intention that the present invention be limited only by the appended claims.

What is claimed is:

1. An assembly of mirrors for viewing an area extending longitudinally rearwardly from a central portion of the back of a vehicle, said mirror assembly comprising:
    a first mirror positioned on a forward side portion of the vehicle so as to be directly viewable by a vehicle occupant;
    a second mirror positioned on an upper rear side portion of the vehicle, the first and second mirrors cooperating with each other to define a first optical axis extending upwardly and rearwardly along the side of the vehicle; and
    a third mirror positioned on the top of the vehicle and spaced forwardly of the second mirror, said third mirror being positioned such that said first optical axis is reflected from said second mirror onto said third mirror to thereby define a second optical axis, said second optical axis being reflected downwardly and rearwardly by said third mirror so as to permit viewing of an area extending longitudinally rearwardly from a central portion of the back of the vehicle.

2. A mirror assembly according to claim 1, wherein said second mirror has a planar reflecting surface.

3. A mirror assembly according to claim 1 or 2, further comprising mounting means for adjustably mounting the second mirror on the side of the vehicle so that the distance between a side edge of the mirror and the side of the vehicle is adjustable and the angular orientation of the second mirror with respect to the vehicle is adjustable.

4. A mirror assembly according to claim 3 wherein said third mirror has a convex reflecting surface.

5. A mirror assembly according to claim 1, wherein said third mirror is mounted on a left rear portion of the top of the vehicle.

6. A mirror assembly according to one of claims 1 or 5, wherein said third mirror has a convex reflecting surface.

7. A mirror assembly according to claim 6, wherein the third mirror has an eight inch diameter, a one foot focal length, and a radius of two feet.

8. A method of mounting mirrors so as to provide viewing of an area extending longitudinally rearwardly from a central portion of the rear of the vehicle, said method comprising:
    positioning a first mirror on a forward side of the vehicle so as to be directly viewable by an occupant of the vehicle;
    positioning a second mirror on an upper rear side of the vehicle so that the reflecting surfaces of the first and the second mirrors define a first axis extending upwardly and rearwardly along the side of the vehicle; and
    positioning a third mirror on the top of the vehicle forwardly of the second mirror so that the first axis is reflected onto the reflecting surface of the third mirror thereby defining a second axis, the reflecting surface of the third mirror being positioned so as to reflect the second axis rearwardly from the back of the vehicle to thereby provide viewing of an area directly behind and extending rearwardly from the rear of the vehicle.

* * * * *